(12) United States Patent
Jacob

(10) Patent No.: US 6,270,419 B1
(45) Date of Patent: Aug. 7, 2001

(54) CONSTANT VELOCITY FIXED JOINT WITH TWO SETS OF RUNNING GROOVES EXTENDING IN OPPOSITE DIRECTIONS

(75) Inventor: Werner Jacob, Frankfurt (DE)

(73) Assignee: GKN Lobro GmbH (DE)

( * ) Notice: Subject to any disclaimer, the term of this patent is extended or adjusted under 35 U.S.C. 154(b) by 0 days.

(21) Appl. No.: 09/352,672

(22) Filed: Jul. 9, 1999

(30) Foreign Application Priority Data

Jul. 10, 1998 (DE) .............................................. 198 31 014

(51) Int. Cl.$^7$ ...................................................... F16D 3/16
(52) U.S. Cl. ............................................ 464/145; 464/906
(58) Field of Search .................................... 464/139, 140, 464/141, 142, 143, 144, 145, 146, 106, 906

(56) References Cited

U.S. PATENT DOCUMENTS

| | | | |
|---|---|---|---|
| 2,949,022 | * 8/1960 | Leon | 464/141 |
| 3,324,682 | * 6/1967 | Bendler | 464/141 |
| 3,447,341 | * 6/1969 | Miller, Jr. | 464/141 |
| 3,475,924 | * 11/1969 | Aucktor | 464/906 |
| 3,935,717 | * 2/1976 | Welschof | 464/141 |
| 4,023,382 | * 5/1977 | Welschof | 464/141 |
| 4,231,232 | * 11/1980 | Otsuka et al. | 464/141 |
| 4,275,571 | * 6/1981 | Welschof | 464/141 |
| 4,968,287 | 11/1990 | Jacob . | |
| 5,201,107 | 4/1993 | Mazziotti . | |
| 5,221,233 | 6/1993 | Jacob . | |
| 5,410,902 | 5/1995 | Jacob . | |
| 5,580,313 | * 12/1996 | Jacob et al. | 464/145 |
| 5,647,801 | 7/1997 | Jacob . | |
| 6,120,382 | * 9/2000 | Sone et al. | 464/145 |

FOREIGN PATENT DOCUMENTS 2 212 882 A    8/1989  (GB) .

* cited by examiner

*Primary Examiner*—Lynne H. Browne
*Assistant Examiner*—Kenn Thompson

(57) ABSTRACT

The invention relates to a constant velocity fixed joint whose outer part 1 and inner part 3 for guiding the balls 5 comprise first outer running grooves 14 and opposed first inner running grooves 17 alternately extending from opposed open ends 10, 11 in the meridian planes in an undercut-free way, as well as second outer running grooves 15 and opposed second inner running grooves 18. For the purpose of achieving very quiet running characteristics, the cage arranged between the inner part 3 and outer part 1 is guided by a hollow spherical inner face 21 on the spherical outer face 19 of the inner part 3. In addition, the cage 4 is provided with outer lugs 29 which project outwardly beyond the outer face of the cage and which increase the size of the lateral guiding faces 21, 24 of the windows 25 for guiding the balls 5.

12 Claims, 3 Drawing Sheets

CONSTANT VELOCITY FIXED JOINT WITH TWO SETS OF RUNNING GROOVES EXTENDING IN OPPOSITE DIRECTIONS

BACKGROUND OF THE INVENTION

The invention relates to a constant velocity fixed joint.

DE 40 31 820 C2 describes a constant velocity fixed joint whose outer part comprises a first open end and a second open end. It comprises a cavity which is centered on the longitudinal outer part axis and which is open towards both open ends. Furthermore, in its inner face delimiting its cavity, the outer part comprises two types of outer running grooves which are arranged in a regular sequence around the longitudinal outer part axis in meridian planes relative to the latter. The first outer running grooves start from the first open end and extend towards the second open end. The second outer running grooves start from the second open end and extend towards the first open end. All outer running grooves extend in a curve-like and undercut-free way from the open end from which they start.

In the cavity of the outer part, there s arranged an inner part. The inner part comprises a longitudinal inner part axis and a spherical outer face which is provided with first and second inner running grooves which are arranged opposite the first and second outer running grooves and extend in meridian planes relative to the longitudinal inner part axis. The first inner running grooves are arranged opposite the first outer running grooves in such a way that they form pairs, with the first inner running grooves starting from the first open end and extending towards the second open end in a curve-like and undercut-free way.

The second inner running grooves are arranged opposite the second outer running grooves and form pairs therewith, with the second inner running grooves starting from the second open end and extending towards the first open end in a curve-like and undercut-free way.

Between the inner face of the outer part and the spherical outer face of the inner part there is arranged a cage whose spherical outer face comprises play relative to the inner face of the outer part. The cage is provided with a cylindrical bore which is held with play relative to the spherical outer face of the inner part. The cage is provided with radial apertures which are distributed in accordance with the pairs of inner running grooves and outer running grooves. The apertures form windows which guide the balls between the lateral guiding faces.

For torque transmitting purposes, the balls engage between the outer part and inner part into the outer running grooves and inner running grooves forming pairs. The centers of all balls are held in a plane which contains the window centers between the lateral guiding faces. The cage is centered entirely by the balls.

The above-described design is disadvantageous in the case of constant velocity joints rotating at high speeds such as they occur, for example, in the propeller shaft for transmitting a rotational movement in passenger cars from the front drive unit of same to the rear axle drive for rear wheel drive vehicles. In particular, vibrations occur to the displacement of the center of gravity of the cage, as a result of which a centrifugal force is generated.

DE 40 42 390 C2 proposes a constant velocity fixed joint whose design corresponds to that of the joint described in DE 40 31 820 C2. However, the cage is divided; it comprises a spherical inner face and lugs in the region of the lateral guiding faces, with said lugs increasing the size of the lateral guiding faces outwardly.

SUMMARY OF THE INVENTION

It is an object of the invention to provide an improved constant velocity fixed joint.

The foregoing and other objects are achieved by a constant velocity fixed joint having an outer part comprising a first open end and a second open end, a longitudinal outer part axis, a cavity which is centered on the longitudinal outer part axis and which is open towards both ends, and first outer running grooves and second outer running grooves in its inner face delimiting the cavity. The first outer running grooves and the second outer running grooves are arranged in a regular sequence around the longitudinal outer part axis in planes which are distributed around the longitudinal outer part axis and contain same. Further, the first outer running grooves, while starting from the first open end, extend towards the second open end, and the second outer running grooves, while starting from the second open end, extend towards the first open end. Both the first and second outer running grooves extend in a curve-like and undercut-free way.

The constant velocity fixed joint further includes an inner part which is arranged in the cavity of the outer part and which comprises a longitudinal inner part axis, a spherical outer face and first inner running grooves and second inner running grooves which are arranged in the spherical outer face and extend in planes which are distributed around the longitudinal inner part axis and contain same. Each of the first inner running grooves are arranged opposite a first outer running groove, and, while starting from the first open end, extend towards the second open end in a curve-like and undercut-free way. Each of the second inner running grooves are arranged opposite a second outer running groove and, while starting from the second open end, extend towards the first open end in a curve-like and undercut-free way.

The constant velocity joint also includes a cage which comprises a continuous inner cage face centered on the longitudinal cage axis and comprises hollow spherical portions, an outer face delimited at least partially by a sphere in the form of an envelope sphere, as well as windows with lateral guiding faces. The windows extend radially in accordance with the pairs of inner running grooves and outer running grooves. The cage, by means of the hollow spherical portions of its inner cage face, is guided on the spherical outer face of the inner part. The outer face of the cage is arranged at a distance from the inner face of the outer part and comprises lugs which increase the size of the two lateral guiding faces and project beyond the outer face. All windows comprise a common central plane extending centrally between the lateral guiding faces and have balls which are each received by opposed inner running grooves and outer running grooves. The balls are guided in the windows of the cage between the lateral guiding faces.

Because the pairs of running grooves extend in opposite directions, it is possible to achieve advantageous centering conditions which are improved even further because of the way in which the cage is centered relative to the inner part. Even at large articulation angles up to approximately 30° and at high rotational speeds, such constant velocity fixed joints ensure smooth running conditions. In addition, they have a long service life. Furthermore, the lugs ensure advantageous guiding conditions for the balls, even at high articulation angles.

In a further embodiment, to achieve advantageous production and assembly conditions, it is proposed that, apart from the projecting outer lugs, the outer face of the cage, at least towards the axial ends, is shaped spherically.

Assembly is particularly easy if the region between the spherical end portions is cylindrical. In this way, it is possible to achieve a kind of plug-in assembly. In other words, the balls of all tracks opening towards one end can be pre-fitted and then introduced together with the cage into the outer part. Subsequently, the balls of the tracks extending in the opposite direction are introduced from the outside through over-articulating. An advantageous design is achieved if the outer part is produced by non-chip forming, starting from a plate metal sheet or a tube, so that the outer part comprises a uniform wall thickness along its length and its circumference. This method requires low forming forces, thus permitting the production of tracks with a high degree of repeat accuracy. Again, this results in smooth running conditions because track shapes deviating from the ideal track are largely eliminated.

For connecting the outer part to a driving or driven component, it is proposed that, at one end of the joint portion comprising the first and second running grooves, the outer part is provided with a flange which extends away from the longitudinal outer part axis. The flange can be formed during the forming process. To reinforce the outer part it is proposed that, at least one end of its portion comprising the first and second outer running grooves, the outer part is provided with a collar which extends outwardly away from the longitudinal outer part axis. If a collar is provided at both ends, one of the collars can be used for attaching a ring for forming a flange if the latter was not formed integrally with the outer part.

The quiet running characteristics and the load bearing capacity are improved further if one first outer running groove and one second outer running groove are alternately arranged in the outer part around the longitudinal outer part axis and if one first inner running groove and one second inner running groove are alternately arranged in the inner part around the longitudinal inner part axis.

The quiet running characteristics are improved further in that the first and the second outer running grooves and the first and the second inner running grooves each comprise a cross-section which is such that, at least in the torque-free condition, a ball received by one pair of outer and inner running grooves contacts the flanks of the associated outer running groove and inner running groove in two points.

When a predetermined torque is exceeded, it is possible that only the diagonally opposed contact points of the inner running groove and outer running groove actually have a load bearing function. As the inner part is still solid and as the outer part, when produced from plate metal, still breathes under load, the two-point contact in the region of the outer running grooves is maintained. As far as control is concerned, it is advantageous to provide an uneven number of first and second outer running grooves and of first and second inner running grooves and the first and second outer running grooves and first and second inner running grooves respectively to be arranged in an alternating sequence.

This also achieves advantageous load bearing conditions because only one running groove of each set of running grooves passes through the plane which contains the longitudinal axes of the outer part and of the inner part and which practically does not participate in the transmission of torque.

As the balls only carry out slight movements in the circumferential direction around the longitudinal axis of the cage, it is possible for the lugs to extend only over part of the length of the guiding faces in the circumferential direction of the cage. The lugs are arranged in the region of the outer running grooves so that they do not interfere with the guidance and pivoting movement of the cage.

Furthermore, it is proposed that the height of the lugs decrease, starting from the lateral guiding faces in both circumferential directions around the longitudinal cage axis. In this way it is ensured that, at large articulation angles, the lugs do not contact the edges of the outer running grooves and inner running grooves.

Brief Description Of The Drawings

Preferred embodiments of the inventive constant velocity fixed joint are diagrammatically illustrated in the drawing wherein.

DETAILED DESCRIPTION OF THE PREFERRED EMBODIMENTS

Figure 1:
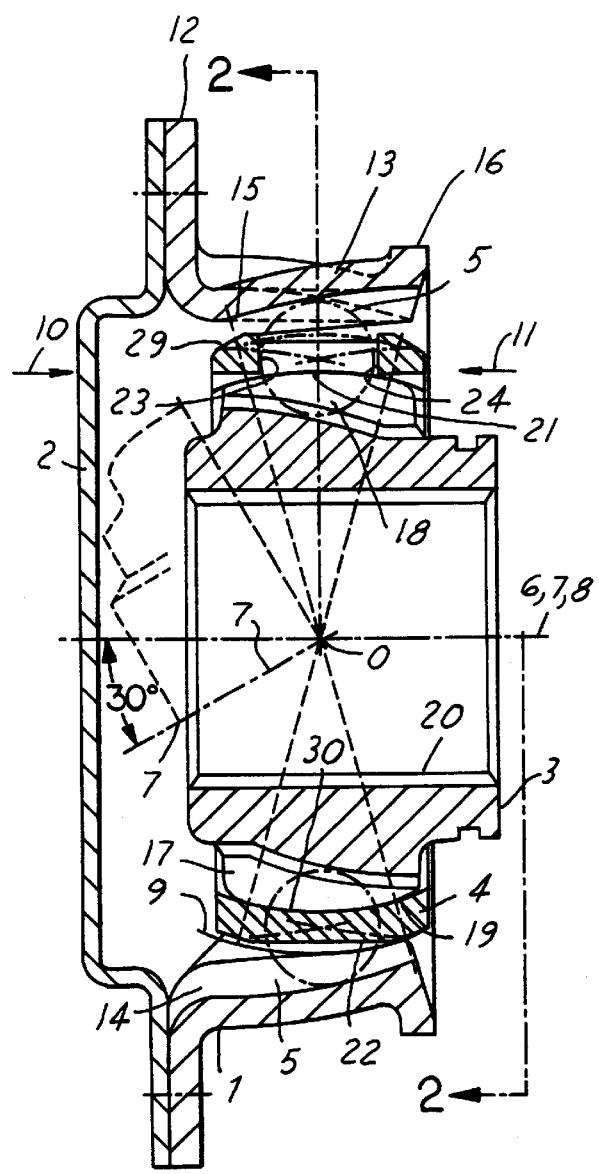
FIG. 1 is a longitudinal section, through sectional line I—I of FIG. 2, of an inventive constant velocity fixed joint in a first embodiment wherein the outer part comprises an integral flange.
Figure 2:
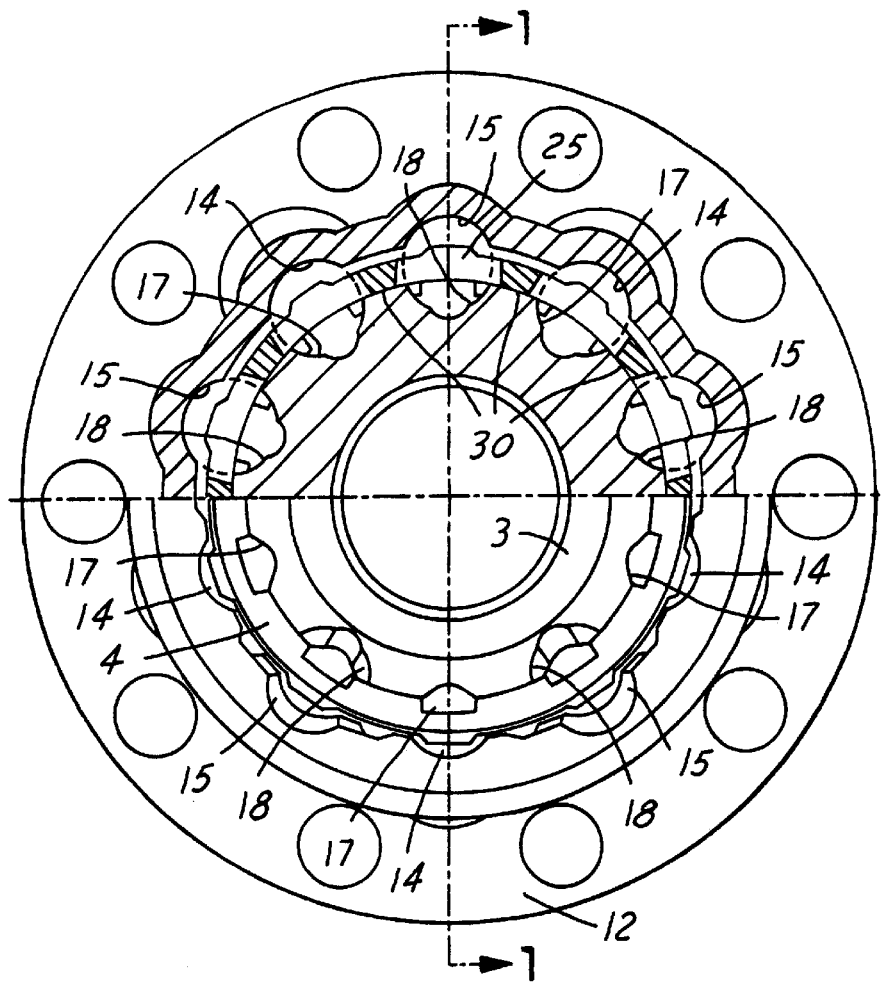
FIG. 2 shows a constant velocity fixed joint according to FIG. 1, the upper half as a side view section, according to sectional line II—II of FIG. 1.
Figure 2A:
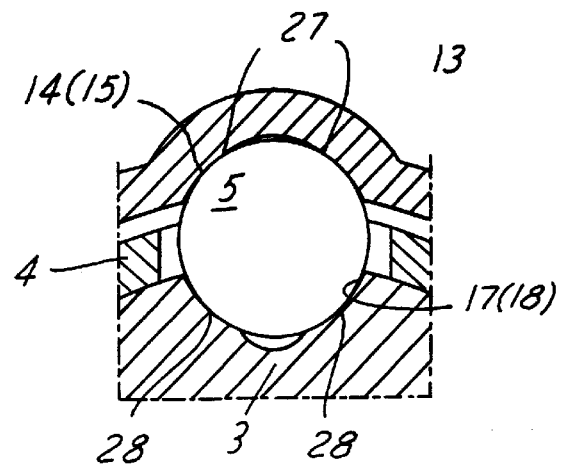
FIG. 2a shows a detail regarding the contact of a ball in an associated outer running groove and inner running groove in an enlarged scale relative to FIG. 2.
Figure 3:
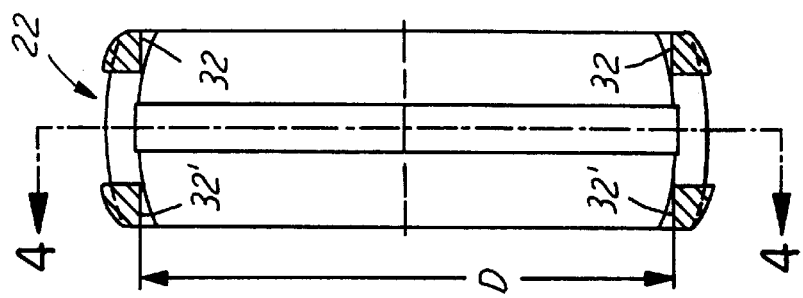
FIG. 3 shows the cage as an individual component in the form of a longitudinal section along sectional line III—III of FIG. 4.
Figure 4:
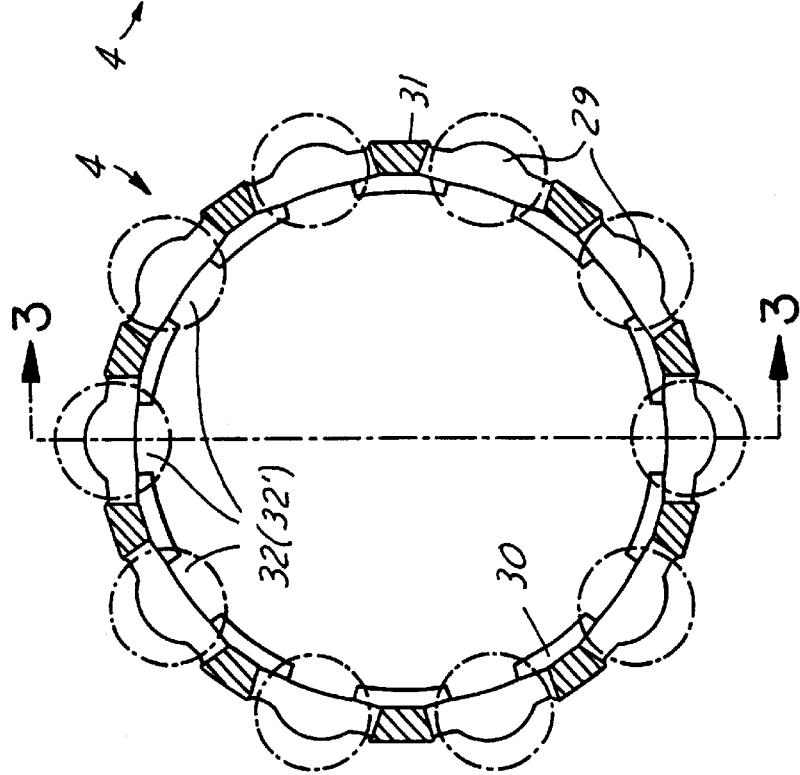
FIG. 4 is a side view according to FIG. 3 in section along sectional line IV—IV of FIG. 3.
Figure 5:
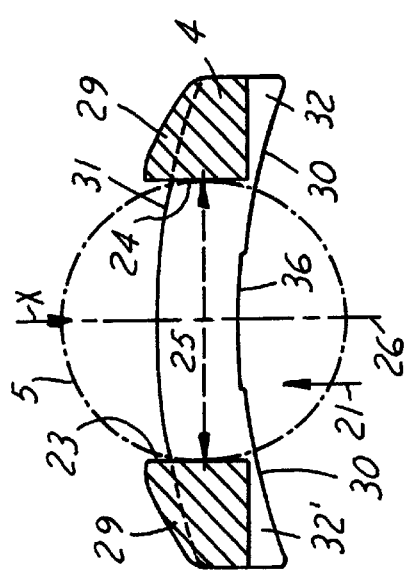
FIG. 5 shows part of a plan view of the cage, concerning the portion which contains a window, in the direction of arrow X of FIG. 6, in an enlarged scale relative to FIGS. 3 and 4.
Figure 6:
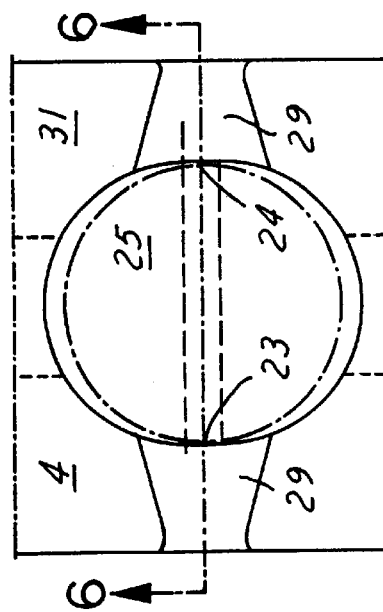
FIG. 6 is a section along sectional line VI—VI of FIG. 5, in an enlarged scale relative to FIGS. 3 and 4.

FIGS. 1, 2 and 2a will be described jointly. The figures show a constant velocity fixed joint with an outer part 1, a cover 2 covering the outer part 1 on one side, with an inner part 3 received in a cavity of the outer part 1, and with a cage 4 which is arranged between the outer part 1 and the inner part 3 and which holds balls 5 which serve to transmit torque between the outer part 1 and the inner part 3.

The components of the constant velocity fixed joint are shown in continuous lines in the aligned position so that the longitudinal outer part axis 6, the longitudinal inner part axis 7 and the longitudinal cage axis 8 coincide. Furthermore, the figures show the inner part 3 relative to the outer part 1 in dash-dotted lines in a position articulated by an articulation angle of 30° relative to the longitudinal part axis 6, with the longitudinal inner part axis 7 also being shown.

The longitudinal cage axis 8 of the cage 4 is in an intermediate position between the two, i.e. when the inner part 3, by means of its longitudinal inner part axis 7, is articulated relative to the longitudinal outer part axis 6 of the outer part 1 by 30° relative to the longitudinal part axis 6. the cage 4 passes through an angle of 15°. It is set to half the articulation angle.

In the case of constant velocity joints, the balls 5 are guided into the angle-bisection plane and held by the cage 4. The outer part 1 comprises a continuous cavity, so that it has two open ends, a first open end 10 and a second open end 11.

The inner face of the outer part 1 in the region between the two open ends 10, 11 has been given the reference number 9.

Furthermore, it can be seen that the outer part 1 is provided with a flange 12 which starts from the portion 13 and extends outwardly, away from the longitudinal outer part axis 6 and is provided at the first open end 10. Said open end 10 is closed by the cover 2 which also comprises a flange-like portion which rests against the flange 12. Furthermore, the flange 12 and the cover 2 comprise fixing bores which are circumferentially distributed around the longitudinal outer part axis 6 and which serve to secure the outer part 1 to a driving or driven component.

In the inner face 9 of the outer part 1, there are provided two sets of outer running grooves 14, 15. The first outer running grooves 14, while starting from the first open end 10, are arranged in planes which are distributed around the longitudinal outer part axis 6 and contain same. The first outer running grooves 14, while starting from the first open end 10, extend towards the second open end 11 in an undercut-free and curve-like way, so that their track bases progressively approach the longitudinal outer part axis 6. The second outer running grooves 15 are also arranged in planes which are distributed around the longitudinal outer part axis 6. They start from the second open end 11 and extend towards the first open end 10 in a curve-like and undercut-free way, so that their track bases progressively approach the longitudinal outer part axis 6. The first outer running grooves 14 alternate with the second outer running grooves 15 on the circumference around the longitudinal outer part axis 6 in the inner face 9. There are provided five first outer running grooves 14 and five second outer running grooves 15, so that, in the outer part 1, one first outer running groove 14 and one second outer running groove 15 are arranged diametrically relative to one another.

The outer part 1 is produced from a plate metal sheet or from a tube and comprises a substantially uniform wall thickness around the circumference. Furthermore, in the region of the second open end 11, the wall of the outer part 1 is formed into a collar 16 which has a reinforcing function. At the other end, i.e. in the region of the first open end 10, the flange 12 provides a corresponding degree of stiffness.

The inner part 3 with its longitudinal inner part axis 7 is received in the cavity of the outer part 1 so as to extend concentrically to the longitudinal outer part axis 6. The inner part 3, in its outer face 19 which is spherical with reference to the articulation center O, is provided with alternately arranged first inner running grooves 17 and second inner running grooves 18 which are circumferentially distributed around the longitudinal inner part axis 7.

The first inner running grooves 17 start from the first open end 10 and extend in the planes distributed with reference to the longitudinal inner part axis, in a curve-like and undercut-free way towards the second open end 11, with an increasing distance between their track bases and the longitudinal inner part axis 7. The second inner running grooves 18 start from the second open end 11, with an increasing distance between their track bases and the longitudinal inner part axis 7. The second inner running grooves 18 start from the second open end 11 and extend in a curve-like and undercut-free way in planes distributed around the longitudinal inner part axis 7 towards the first open end 10, so that their track bases move away from the associated longitudinal inner part axis 7 towards the other open end. Always one first outer running groove 14 is positioned opposite a first inner running groove 17, so that they form pairs and form a cross-section which opens toward the first open end 10. Always one second outer running groove 15 and a second inner running groove 18 are positioned opposite one another and form a cross-section which opens towards the second open end 11.

Furthermore, the inner part 3 comprises an attaching bore 20 which is centered on the longitudinal inner part axis 7 and into which it is possible to insert a connecting shaft. For this purpose, the attaching bore 20 is provided with toothing.

The space between the inner face 9 of the outer part 1 and the spherical outer face 19 of the inner part 4 accommodates the cage 4. In accordance with the pairs of first outer running grooves 14 and first inner running grooves 17 and the pairs of second outer running grooves 15 and second inner running grooves 18, the cage 4 is provided with circumferentially distributed apertures which extend from its inner face 21 to its outer face 22 and form the windows 25 for accommodating the balls 5. The balls 5 are guided between the lateral guiding faces 23, 24 of the windows 25 of the cage 4, which guiding faces are arranged so as to be offset in the direction of the longitudinal cage axis 8. The balls 5 project outwardly into an associated first outer running groove 14 and second outer running groove 15 respectively and inwardly for the purpose of engaging a first inner running groove 17 and a second inner running groove 18 respectively. The cage 4 is hollow and comprises an inner cage face 21 which, between two windows 25, comprises hollow spherical portions by means of which the cage 4 is guided on the portions of the spherical outer face 19, which are positioned between the inner running grooves 17, 18.

Both types of outer running grooves 14, 15 and inner running grooves 17, 18 are designed as illustrated in FIG. 2a. As shown in FIG. 2a, their cross-sectional shape deviates from the circular cross-section, so that two contact points 27 occur with the associated ball 5 at the flanks. Both types of inner running grooves 17, 18 comprise a cross-section, and in consequence, two contact points 28 occur with the associated ball 5 at the flanks. In other words, the first inner running grooves, first outer running grooves, second inner running grooves and second outer running grooves each contact a ball at two contact points. Thus, a ball received respectively by each pair of first inner and outer running grooves, and second inner and outer running grooves, is contacted at four points. A ball 5 received between an outer running groove and an inner running groove, by being in contact with four points, is thus guided by the associated running grooves into the angle-bisecting plane because of its curve-like path extending towards the longitudinal outer part axis 5 and the longitudinal inner part axis 7. As a result, the outer part 1 pivots relative to the inner part 3 at the same time as the cage 4 pivots relative to the inner part 3, around a common articulation center O. As the cage 4 is guided on the inner part 3, the inner part 3 cannot carry out any axial movements relative to the outer part 1. Only angular movements can be carried out, so that there is obtained a constant velocity fixed joint.

Both the first outer running grooves 14 and the second outer running grooves 15 can be produced in one tool by non-chip forming, starting from opposite ends. This also applies to the inner part 3 with the first inner running grooves 17 and second inner running grooves 18, but the inner part 3 is a solid part. For further improving the guiding conditions for the balls 5 in the windows 25 and the assembly of the cage 4, there is provided another embodiment of the cage 4 which will be described below with reference to FIGS. 3 to 6.

For increasing the length of the guiding faces 23, 24 which centrally between them define a central plane 26 containing the centers of all balls 5 received in the cage 4, the cage 4 is provided with lugs 29 which project outwardly beyond the outer face 22. Furthermore, the cage 4 in its inner face 21, comprises a groove 36 which is located in the region of the windows 25, which is centered on the central plane 26 and which frees the cage 4 relative to the spherical outer face of the inner part. The outer lugs 29 extend only over a short distance of the cage windows 25 in the circumferential direction around the longitudinal cage axis 8.

To facilitate the assembly of the inner part 3 and cage 4, the cage 4, in its inner face 21, is provided with assembly grooves 32, 32' which are located in the region of the windows 25 and extend parallel to the longitudinal cage axis 8. The assembly grooves 32, 32' start from the respective end faces of the cage 4 and end in the region of a window 25. Between two diametrically opposed assembly grooves 32, 32' there is provided a passage D whose diameter is greater than the diameter of the spherical outer face of the inner part. The width of the assembly grooves 32, 32' is greater than the width of the webs between two adjoining inner running grooves of the inner part. Although, for assembly purposes, assembly grooves are required to start from one end face of the cage 4 only, the invention proposes a symmetric design in order to avoid distortion during the cage hardening process. With the exception of the projecting outer lugs 29, the cage 4 comprises a spherical outer portion 31 whose center is centered on the point of intersection between the central plane 26 and the longitudinal cage axis 8. The same applies to the hollow spherical portion 30.

Assembly takes place in such a way that, with reference to FIG. 1, outside the outer part 1, the cage 4 and the inner part 3 are first turned relative to one another in such a way that the assembly grooves allow the cage 4 to be slid on to the inner part 3. Thereafter, the cage 4 is turned relative to the inner part in such a way that the windows 25 are positioned over the inner running grooves 17, 18. Then, the balls 5, with reference to the second inner running grooves 18, are introduced from the outside through the windows 25. The unit consisting of the inner part 3, the cage 4 and the balls 5 is then axially inserted into the outer part 1, with the balls 5 introduced into the second inner running grooves 18 being axially inserted into the second outer running grooves 15. Subsequently, the inner part 3 is articulated relative to the outer part 1 and the balls 5 associated with the first outer running grooves 14 and first inner running grooves 17 can be inserted one after the other into the window 25 at maximum articulation regarding the position of a first inner running groove relative to the associated first outer running groove, at which articulation angle the longitudinal outer and inner part axes 6, 7 are positioned in one plane, with the associated window 25 being accessible from the outside. In this way, the balls 5 can be introduced one after the other. The diameter of the spherical portion 31 of the cage 4 is dimensioned in such a way that it is smaller than the free cross-section of the inner face 9 of the outer part 1 in the region of the first open end 10, from where the unit consisting of the inner part 3 and cage 4 is inserted into the outer part 1.

Figure 7:
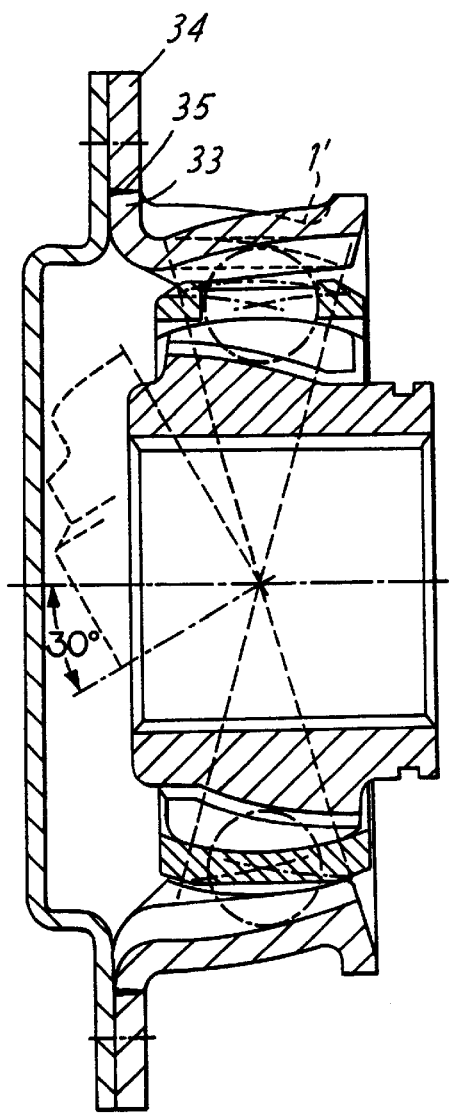
FIG. 7 is another embodiment of the present constant velocity fixed joint with the outer part having a welded-on ring for forming the flange.

FIG. 7 shows a modified embodiment of a constant velocity fixed joint with an outer part 1' which comprises a collar 33 towards the flange end as well. The flange is formed by a ring 34 attached to the collar 33, which ring 34 is connected to the collar 33 of the outer part 1 by a weld 35.

What is claimed is:

1. Constant velocity fixed joint comprising:
    an outer part (1, 1') comprising a first open end (10) and a second open end (11), a longitudinal outer part axis (6), a cavity which is centered on the longitudinal outer part axis (6) and which is open towards both open ends (10, 11) and first outer running grooves (14) and second outer running grooves (15) formed in an inner face (9) delimiting the cavity, wherein the first outer running grooves (14) and the second outer running grooves (15) are arranged in a regular sequence around the longitudinal outer part axis (6) in planes which are distributed around the longitudinal outer part axis (6) and contain same, the first outer running grooves (14), while starting from the first open end (10), extending towards the second open end (11) and the second outer running grooves (15), while starting from the second open end (11), extending towards the first open end (10), both the first and the second outer running grooves (14, 15) extending in a curve-like and undercut-free way;
    an inner part (3) arranged in the cavity of the outer part (1, 1') comprising a longitudinal inner part axis (7), a spherical face (19) and first inner running grooves (17) and second inner running grooves (18) arranged in the spherical outer face and extend in planes which are distributed around the longitudinal inner part axis (7) and contain same, each of the first inner running grooves (17) being arranged opposite a first outer running groove (14) and, while starting from the first open end (10), extending towards the second open end (11), in a curve-like and undercut-free way, and each of the second inner running grooves (18) being arranged opposite a second outer running groove (15) and, while starting from the second open end (11), extending towards the first open end (10) in a curve-like and undercut-free way;
    a cage (4) comprising a continuous inner cage face (21) which is centered on the longitudinal cage axis (8) and comprises hollow spherical portions (30) defining a groove (36), an outer face (22) delimited at least partially by a sphere in the form of an envelope sphere, as well as windows (25) with lateral guiding faces (23, 24), said windows (25) extending radially in accordance with the pairs of inner running grooves (17, 18) and outer running grooves (14, 15), the cage (4), by means of its hollow spherical portions (30) of the inner cage face (21), being guided on the spherical outer face (19) of the inner part (3) and with the outer face (22) of the cage (4) being arranged at a distance from the inner face (9) of the outer part (1, 1') and comprising outer lugs (29) which increase the size of the two lateral guiding faces (23, 24) and project beyond the outer face (22), and all said windows (25) comprising a common central plane (26) extending centrally between the lateral guiding faces (23, 24); and
    a plurality of balls (5) wherein each ball is received by opposed inner running grooves (17, 18) and outer running grooves (14, 15) and are guided in the windows (25) of the cage (4) between the lateral guiding faces (23, 24).

2. A constant velocity fixed joint according to claim 1, wherein the outer face (22) of the cage (4) includes spherical end portions (32).

3. A constant velocity fixed joint according to claim 2, wherein the region between the spherical end portions (32) includes cylindrical outer face portions (31).

4. A constant velocity fixed joint according to claim 1, wherein the outer part (1, 1') comprises a substantially uniform wall thickness along its length and its circumference.

5. A constant velocity fixed joint according to claim 1, wherein at one end of a portion (13) comprising the first and second outer running grooves (14, 15), the outer part (1, 1') is provided with a flange (12, 33), which extends away from the longitudinal outer part axis (6).

6. A constant velocity fixed joint according to claim 4, wherein at least one end of a portion (13) comprising the first and second outer running grooves (14, 15), the outer part (1, 1') is provided with a collar (16, 33) which extends outwardly away from the longitudinal outer part axis (6).

7. A constant velocity fixed joint according to claim 6, wherein a ring (34) for forming a flange is connected to one of the collars (33).

8. A constant velocity fixed joint according to claim 1, wherein one first outer running groove (14) and one second outer running groove (15) are alternately arranged in the outer part (1, 1') around the longitudinal outer part axis (6) and that one first inner running groove (17) and one second inner running groove (18) are alternately arranged in the inner part (3) around the longitudinal inner part axis (7).

9. A constant velocity fixed joint according to claim 1, wherein the first and the second outer running grooves (14, 15) and the first and the second inner running grooves (17, 18) each comprise a cross-section which is such that, at least in a torque-free condition, a ball (5) received by one pair of outer and inner running grooves (14, 17; 15, 18) contacts the flanks of the associated outer running groove (14, 15) and inner running groove (17, 18) at two points (27, 28).

10. A constant velocity fixed joint according to claim 1, comprising an uneven number of first outer running grooves (14) and an uneven number of second outer running grooves (15 and corresponding first and second inner running grooves (17, 18) and wherein the first and second outer running grooves (14, 15) and the first and second inner running grooves (17, 18) respectively are arranged in an alternating sequence.

11. A constant velocity fixed joint according to claim 1, wherein the outer lugs (29) extend over a portion of the length of the guiding faces (23, 24) in the circumferential direction of the cage (4).

12. A constant velocity fixed joint according to any one of claims 1 through 11, wherein the height of the lugs (29) decreases, starting from the lateral guiding faces (23, 24) in both circumferential directions around the longitudinal cage axis.

* * * * *